3,067,023
PROCESS FOR THE UPGRADING OF ROCK PHOSPHATE
Alexander Flaszenberg, Givatayim, Itzhak Prulov, Tel Aviv, and Mordhai Lapidot, Bnei Braq, Israel, assignors to The Government of Israel on behalf of The State of Israel
No Drawing. Filed Oct. 4, 1960, Ser. No. 60,302
Claims priority, application Israel Oct. 7, 1959
3 Claims. (Cl. 71—37)

The present invention concerns the upgrading of calcite containing phosphate.

One of the known methods of upgrading phosphate rock consists in the calcination of the crude rock phosphate whereby the calcite is converted into quicklime, and separation of the latter either as such or after slaking.

Slaking can be performed either with relatively small amounts of water so that there results a dry mixture of slaked lime and phosphate (dry slaking) or by slurrying the calcination product in water (wet slaking). In the case of dry slaking air separation can be used for the removal of the slaked lime while in the case of wet slaking other means have to be used, e.g. hydro-cyclones.

In all these processes a considerable proportion—up to about 25%—of the $P_2O_5$ present in the original rock is entrained in the quicklime or slaked lime and thereby lost for all practical purposes. It is for this reason that processes for the upgrading of phosphate which are based on calcination have so far been considered as unsatisfactory from an economic point of view.

With a view to avoiding at least partially the above $P_2O_5$ losses it has also been suggested to convert the calcium hydroxide resulting from the slaking into a water soluble salt, such as for example calcium chloride, e.g. by treatment with magnesium chloride. However, also this procedure turned out to be unsatisfactory.

It is known that $Ca(OH)_2$ can be carbonated under hydrous conditions. The present invention is based on the observation that by properly controlling the carbonation small-size calcite particles can be obtained which are capable of forming suspensions in water and can therefore be separated from the accompanying phosphate which latter, when introduced into water, settles practically instantaneously.

The invention consists in a process of upgrading of calcite containing phosphate, wherein the phosphate to be upgraded is calcined, the calcination product is wet-slaked and a $CO_2$-containing gas is bubbled through the resulting aqueous dispersion at such a rate that the pH inside the dispersion is maintained until substantially all the $Ca(OH)_2$ is converted into $CaCO_3$, substantially at the magnitude it had prior to the introduction of the gas.

The starting material may either be natural phosphate rock or a product previously enriched in some other way.

The carbonation of the calcium hydroxide can be carried out with pure carbon dioxide or with any gas mixture containing carbon dioxide provided that the remaining constituents of the mixture do not react with calcium hydroxide, the resulting $CaCO_3$ or the phosphate. In practice the stack gas from the calcination kiln will preferably be used. The gas mixture employed should preferably contain at least 5% by volume of $CO_2$.

The carbonation rate is a function of the rate of dissolution of the $Ca(OH)_2$ and depends accordingly on the water: phosphate ratio. In practice it has been found that the time necessary for the completion of carbonation varies usually between 2 and 3 hours.

The invention is illustrated by the following examples without being limited thereto.

*Example 1*

1000 gr. of rock phosphate containing 25% by weight of $P_2O_5$ and 13% by weight of $CO_2$ was calcined at 850° C. The calcination product amounted to 840 gr. and contained 29% by weight of $P_2O_5$ and 5% by weight of $CO_2$. This product was introduced while stirring into 4200 ml. of water and pure $CO_2$ gas was bubbled through the resulting slurry at a rate of 470 ml./min. After 140 minutes the pH dropped sharply from its initial value of 12.5 to 7 and the carbonation was completed.

Stirring was interrupted and after 1 minute the entire $P_2O_5$ had settled while the $CaCO_3$ remained as a fine suspension in the water. The supernatant suspension was decanted and the remaining phosphate washed, filtered and dried. There was thus obtained 690 gr. of phosphate containing 34.5% by weight of $P_2O_5$ and 5% by weight of $CO_2$. The enrichment from crude rock phosphate containing 25% by weight of $P_2O_5$ to a product containing 35% by weight of $P_2O_5$ was accomplished with a loss of 4.4% of $P_2O_5$ calculated on the initial amount and at an expenditure of 77% excess of $CO_2$.

*Example 2*

23 kg. of rock phosphate containing 28% by weight of $P_2O_5$ was calcined; the calcination product amounted to 20 kg. and contained 32% by weight of $P_2O_5$ and 1.1% by weight of $CO_2$. This product was introduced while stirring into 100 litres of water and stack gas from the calcination plant containing 14% by volume of $CO_2$ was bubbled through the slurry at the rate of 4 m.³/hr. At the end of 3 hours the pH dropped to 7 and the reaction was completed.

The suspension of $CaCO_3$ fines was decanted from the precipitated phosphate which later was washed, filtered and dried. The enriched phosphate amounted to 17.5 kg. and contained 35% by weight of $P_2O_5$ and 2.1% of $CO_2$.

The total loss during enrichment was 4.5% or $P_2O_5$ calculated on the initial amount.

*Example 3*

Previously enriched Negev (Israel) rock phosphate of 31% $P_2O_5$ content was calcined at 875–900° C. and the resulting product contained 1.1% by weight of $CO_2$ and 32.5% of $P_2O_5$.

475 gr. of the calcination product were introduced into 2.5 litres of water while stirring and pure $CO_2$ gas was bubbled through the slurry. At the end of 3 hours the pH dropped from its initial value of 12.5 to 8 and the reaction was completed.

Separation and purification of the phosphate was effected as described in the previous example and there was thus obtained 425 gr. of enriched rock phosphate containing 35.5% by weight of $P_2O_5$ and 2% by weight of $CO_2$. The total $P_2O_5$ loss amounted to 3.9% calculated on the initial amount.

*Example 4*

23 kg. of previously enriched Negev rock phosphate containing 31% by weight of $P_2O_5$ was calcined at 875–900° C. and there resulted 20 kg. of a product containing 32.5% by weight of $P_2O_5$ and 1.1% of $CO_2$.

This product was introduced while stirring into 100 litres of water and stack gas from the calcination plant containing 10% by volume of $CO_2$ was bubbled through the slurry at the rate of 4.5 m.³/hr. At the end of 3 hours the pH dropped from its initial value of 12.5 to 8 and the reaction was completed.

The phosphate was separated and purified as in the previous examples and there was obtained 17 kg. of enriched phosphate containing 36.5% by weight of $P_2O_5$ and 1% by weight of $CO_2$. The $P_2O_5$ loss was 4.3% calculated on the initial amount.

We claim:

1. The process of upgrading rock phosphate which contains calcite, comprising the steps of calcining the rock phosphate to be upgraded, wet-slaking the calcined product to provide an aqueous dispersion containing a saturated solution of calcium hydroxide, passing a $CO_2$-containing gas through said dispersion, controlling the rate of flow of said gas through the dispersion to effect the conversion of the dissolved calcium hydroxide into calcium carbonate at the rate at which calcium hydroxide goes into said solution, thereby to maintain the pH value of the dispersion substantially at the initial value thereof prior to the passage of the gas through the dispersion, and discontinuing the passage of gas through the dispersion when substantially all the remaining calcium hydroxide is in solution so that further conversion of calcium hydroxide into calcium carbonate causes the pH value of the dispersion to undergo a substantial drop, whereby fine particles of calcium carbonate are suspended in the water for easy separation from the phosphate which settles in the water.

2. The process of upgrading rock phosphate which contains calcite, comprising the steps of calcining the rock phosphate to be upgraded, wet-slaking the calcined product to provide an aqueous dispersion containing a saturated solution of calcium hydroxide and having a pH value of approximately 12.5, passing a gas containing at least 5 percent by volume of $CO_2$ through said dispersion for a period of approximately 2 to 3 hours and at a rate of flow which effects conversion of dissolved calcium hydroxide into calcium carbonate substantially at the rate at which undissolved calcium hydroxide goes into said solution, and thereby substantially maintains said pH value in said dispersion throughout said period, and discontinuing the passage of said gas through said dispersion when substantially all the remaining calcium hydroxide is in said solution so that further conversion of calcium hydroxide into calcium carbonate causes the pH value of the dispersion to undergo a substantial drop, whereby fine particles of calcium carbonate are formed as a suspension in the water for easy separation from the phosphate which settles in the water.

3. The process as in claim 2; further comprising decanting said suspension of calcium carbonate, and washing, filtering and drying the remaining phosphate.

References Cited in the file of this patent
FOREIGN PATENTS 11,804     Great Britain _____ 1893